(12) United States Patent
Thuilliez

(10) Patent No.: US 10,737,532 B2
(45) Date of Patent: *Aug. 11, 2020

(54) REINFORCED PRODUCT COMPRISING A COMPOSITION CONTAINING A RAPID VULCANIZATION ACCELERATOR AND TIRE COMPRISING SAID REINFORCED PRODUCT

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Anne-Lise Thuilliez, Clermont-Ferrand (FR)

(73) Assignee: Compagnie Generale Des Establissements Michelin, Clermont-Ferrand (FR)

( * ) Notice: Subject to any disclaimer, the term of this patent is extended or adjusted under 35 U.S.C. 154(b) by 244 days.

This patent is subject to a terminal disclaimer.

(21) Appl. No.: 15/518,589

(22) PCT Filed: Oct. 9, 2015

(86) PCT No.: PCT/EP2015/073422
§ 371 (c)(1),
(2) Date: Apr. 12, 2017

(87) PCT Pub. No.: WO2016/058943
PCT Pub. Date: Apr. 21, 2016

(65) Prior Publication Data
US 2017/0239991 A1    Aug. 24, 2017

(30) Foreign Application Priority Data
Oct. 13, 2014 (FR) ..................... 14 59808

(51) Int. Cl.
*C08L 9/00* (2006.01)
*B60C 1/00* (2006.01)
*C08K 13/06* (2006.01)
*C08K 5/44* (2006.01)
*C08J 5/00* (2006.01)
*C08K 5/00* (2006.01)

(52) U.S. Cl.
CPC .............. B60C 1/0041 (2013.01); *C08J 5/00* (2013.01); *C08K 5/0025* (2013.01); *C08K 5/44* (2013.01); *C08K 13/06* (2013.01); *B60C 2001/0066* (2013.01); *C08J 2307/00* (2013.01); *C08J 2477/06* (2013.01)

(58) Field of Classification Search
CPC ....... C08J 5/00; C08J 5/04–08; C08K 5/0025; C08K 5/44; C08K 13/06; D06M 15/507; D06M 15/59; D07B 2201/2083
USPC ...................................................... 523/222
See application file for complete search history.

(56) References Cited

U.S. PATENT DOCUMENTS

| | | | |
|---|---|---|---|
| 5,852,099 A | 12/1998 | Vanel | 524/494 |
| 5,977,238 A | 11/1999 | Labauze | 524/492 |
| 6,013,718 A | 1/2000 | Cabioch et al. | 524/506 |
| 6,330,897 B1* | 12/2001 | Nakamura | B60C 1/00 152/537 |
| 6,503,973 B2 | 1/2003 | Robert et al. | 524/492 |
| 6,641,905 B1 | 11/2003 | Fujimoto et al. | 428/297.4 |
| 6,815,473 B2 | 11/2004 | Robert et al. | 523/215 |
| 7,250,463 B2 | 7/2007 | Durel et al. | 524/492 |
| 7,300,970 B2 | 11/2007 | Durel et al. | 524/493 |
| 7,312,264 B2 | 12/2007 | Gandon-Pain | 524/236 |
| 7,491,767 B2 | 2/2009 | Durel et al. | 524/493 |
| 7,820,771 B2 | 10/2010 | Lapra et al. | 525/479 |
| 8,344,063 B2 | 1/2013 | Marechal et al. | 524/571 |
| 8,455,584 B2 | 6/2013 | Robert et al. | 524/505 |
| 8,461,269 B2 | 6/2013 | Varagniat et al. | 525/209 |
| 8,492,479 B2 | 7/2013 | Robert et al. | 525/89 |
| 8,763,662 B2 | 7/2014 | Abad et al. | 152/451 |
| 8,785,543 B2 | 7/2014 | Abad et al. | |
| 8,790,788 B2 | 7/2014 | Custodero et al. | 428/500 |

(Continued)

FOREIGN PATENT DOCUMENTS

| | | |
|---|---|---|
| CN | 103118848 A | 5/2013 |
| DE | 2450962 | 5/1975 |

(Continued)

OTHER PUBLICATIONS

International Search Report dated Jan. 12, 2016, issued by EPO in connection with International Application No. PCT/EP2015/073422.

B. Rodgers, et al., "Rubber Compounding", Encyclopedia of Polymer Science and Technology, 612 Rubber Chemicals, vol. 11, pp. 648-652 (2004).

* cited by examiner

*Primary Examiner* — Hannah J Pak

(74) *Attorney, Agent, or Firm* — Venable LLP

(57) ABSTRACT

A reinforced product, which can be used especially for reinforcing a finished rubber article, comprises one or more textile or metallic reinforcing thread(s), said thread(s) being covered with a sheath comprising a thermoplastic polymer composition, the sheathed thread(s) being themselves embedded in a rubber composition referred to as coating rubber, characterized in that this coating rubber is a composition based on at least one diene elastomer, a reinforcing filler, and a sulfur-based vulcanization system, which system comprises a vulcanization accelerator having a vulcanization initiation time, referred to as "t0", of less than 3.5 minutes, preferably of less than or equal to 3 minutes.

22 Claims, 2 Drawing Sheets

(56) References Cited

U.S. PATENT DOCUMENTS

| | | |
|---|---|---|
| 8,883,929 B2 | 11/2014 | Gandon-Pain et al. ... 525/326.5 |
| 8,968,871 B2 | 3/2015 | Abad et al. .................. 428/378 |
| 8,969,455 B2 | 3/2015 | Katou et al. .................. 524/322 |
| 8,973,634 B2 | 3/2015 | Custodero et al. ........... 152/451 |
| 9,540,766 B2* | 1/2017 | Abad .................... B29B 15/08 |
| 9,617,661 B2 | 4/2017 | Custodero et al. |
| 10,173,468 B2* | 1/2019 | Thuilliez .............. B60C 1/0041 |
| 2001/0036991 A1 | 11/2001 | Robert et al. .................. 524/492 |
| 2002/0183436 A1 | 12/2002 | Robert et al. .................. 524/492 |
| 2003/0079817 A1 | 5/2003 | Miyazaki et al. ............ 152/537 |
| 2004/0016495 A1 | 1/2004 | Serra et al. |
| 2005/0004297 A1 | 1/2005 | Durel et al. .................. 524/493 |
| 2005/0016650 A1 | 1/2005 | Durel et al. ............... 152/209.1 |
| 2005/0016651 A1 | 1/2005 | Durel et al. ............... 152/209.1 |
| 2006/0089445 A1 | 4/2006 | Gandon-Pain ............... 524/492 |
| 2006/0180258 A1 | 8/2006 | Miyazaki et al. ............ 152/537 |
| 2008/0132644 A1 | 6/2008 | Lapra et al. .................. 525/105 |
| 2009/0270558 A1 | 10/2009 | Gandon-Pain et al. ...... 525/190 |
| 2010/0022714 A1 | 1/2010 | Varagniat et al. ............ 525/209 |
| 2010/0184912 A1 | 7/2010 | Marechal et al. ............ 524/571 |
| 2010/0249270 A1 | 9/2010 | Robert et al. .................. 523/150 |
| 2010/0252156 A1 | 10/2010 | Robert et al. ............... 152/209.1 |
| 2011/0021702 A1 | 1/2011 | Gandon-Pain et al. ........ 525/55 |
| 2012/0090756 A1* | 4/2012 | Le Clerc ................ B32B 25/08 152/527 |
| 2012/0125506 A1 | 5/2012 | Custodero et al. ........... 152/451 |
| 2012/0128972 A1 | 5/2012 | Custodero et al. ........... 428/339 |
| 2012/0180921 A1 | 7/2012 | Abad et al. .................. 152/450 |
| 2012/0208948 A1 | 8/2012 | Gandon-Pain et al. ...... 524/521 |
| 2012/0252928 A1 | 10/2012 | Marechal et al. ............ 523/155 |
| 2012/0267023 A1 | 10/2012 | Abad et al. .................. 152/451 |
| 2013/0146198 A1 | 6/2013 | Chang et al. ................. 152/526 |
| 2013/0177764 A1 | 7/2013 | Abad et al. .................. 428/378 |
| 2013/0220505 A1 | 8/2013 | Pottier et al. |
| 2013/0261242 A1 | 10/2013 | Katou et al. .................. 524/322 |
| 2013/0273366 A1 | 10/2013 | Abad et al. .................. 428/378 |
| 2013/0280511 A1 | 10/2013 | Abad et al. .................. 428/220 |
| 2014/0044964 A1 | 2/2014 | Abad et al. .................. 428/378 |
| 2014/0045983 A1 | 2/2014 | Abad et al. .................. 524/440 |
| 2014/0045984 A1 | 2/2014 | Abad et al. .................. 524/440 |
| 2014/0051312 A1 | 2/2014 | Abad et al. .................. 442/149 |
| 2014/0235124 A1 | 8/2014 | Doisneau et al. ............ 442/149 |
| 2014/0235125 A1 | 8/2014 | Doisneau et al. ............ 442/149 |
| 2014/0290204 A1 | 10/2014 | Custodero et al. |
| 2014/0308864 A1 | 10/2014 | Doisneau et al. ............ 442/149 |
| 2015/0004413 A1 | 1/2015 | Abad et al. .................. 428/378 |
| 2015/0030851 A1 | 1/2015 | Abad et al. .................. 428/378 |
| 2015/0114534 A1 | 4/2015 | Huyghe, Jr. ............. B60C 9/20 |
| 2015/0217602 A1 | 8/2015 | Salgues et al. ......... B60C 9/007 |
| 2017/0226322 A1* | 8/2017 | Thuilliez .................. C08K 5/47 |
| 2017/0233556 A1* | 8/2017 | Thuilliez .................... C08J 5/06 152/537 |
| 2017/0246905 A1 | 8/2017 | Thuilliez |

FOREIGN PATENT DOCUMENTS

| | | |
|---|---|---|
| EP | 0 735 088 A1 | 10/1996 |
| EP | 1 098 110 A1 | 5/2001 |
| EP | 1 127 909 A1 | 8/2001 |
| EP | 1 258 338 A2 | 11/2002 |
| EP | 2 623 546 A1 | 8/2013 |
| FR | 2 740 778 A1 | 5/1997 |
| FR | 2 765 882 A1 | 1/1999 |
| FR | 2952076 A1 | 5/2011 |
| FR | 2982885 A1 | 5/2013 |
| JP | 10-53981 A | 2/1998 |
| JP | 2002-331806 A | 11/2002 |
| WO | 97/36724 A2 | 10/1997 |
| WO | 99/16600 A1 | 4/1999 |
| WO | 01/92402 A1 | 12/2001 |
| WO | 03/002648 A1 | 1/2003 |
| WO | 03/002649 A1 | 1/2003 |
| WO | 03/016387 A1 | 2/2003 |
| WO | 03/066353 A1 | 8/2003 |
| WO | 2004/096865 A2 | 11/2004 |
| WO | 2006/069792 A1 | 7/2006 |
| WO | 2006/069793 A1 | 7/2006 |
| WO | 2008/003434 A1 | 1/2008 |
| WO | 2008/003435 A1 | 1/2008 |
| WO | 2008/141702 A1 | 11/2008 |
| WO | 2009/000750 A1 | 12/2008 |
| WO | 2009/000752 A1 | 12/2008 |
| WO | 2010/105975 A1 | 9/2010 |
| WO | 2010/136389 A1 | 12/2010 |
| WO | 2011/012521 A1 | 2/2011 |
| WO | 2011/042507 A1 | 4/2011 |
| WO | 2011/051204 A1 | 5/2011 |
| WO | 2011/144472 A1 | 11/2011 |
| WO | 2011/147710 A1 | 12/2011 |
| WO | 2012/016757 A1 | 2/2012 |
| WO | 2012/038340 A1 | 3/2012 |
| WO | 2012/038341 A1 | 3/2012 |
| WO | 2012/069346 A1 | 5/2012 |
| WO | 2012/104279 A1 | 8/2012 |
| WO | 2012/104280 A1 | 8/2012 |
| WO | 2012/104281 A1 | 8/2012 |
| WO | 2013/017421 A1 | 2/2013 |
| WO | 2013/017422 A1 | 2/2013 |
| WO | 2013/017423 A1 | 2/2013 |
| WO | 2013/117474 A1 | 8/2013 |
| WO | 2013/117475 A1 | 8/2013 |
| WO | 2013/150088 A1 | 10/2013 |
| WO | 2014/049058 A1 | 4/2014 |

REINFORCED PRODUCT COMPRISING A COMPOSITION CONTAINING A RAPID VULCANIZATION ACCELERATOR AND TIRE COMPRISING SAID REINFORCED PRODUCT

FIELD OF THE INVENTION

The present invention relates to the field of reinforced products (or reinforced semi-finished products) comprising metallic or textile reinforcing elements or "reinforcers", sheathed in a thermoplastic polymer composition, said sheathed reinforcers being embedded in a rubber composition. These reinforced products or reinforced semi-finished products can be used especially for reinforcing complex semi-finished products or finished articles made of rubber, such as, for example, motor vehicle tyres.

These reinforced products or reinforced semi-finished products may be used in particular in carcass reinforcements for tyres, the crown, and also for the protection of crown reinforcements, also referred to as belts, of these tyres.

RELATED ART

In a known way, a tyre with radial carcass reinforcement comprises a tread, two inextensible beads, two sidewalls connecting the beads to the tread and a belt positioned circumferentially between the carcass reinforcement and the tread, this belt and the carcass reinforcement consisting of various plies (or "layers") of rubber, reinforced by reinforcing elements or reinforcers such as cords or monofilaments of metallic or textile type.

More specifically, a tyre belt generally consists of at least two superimposed belt plies, sometimes referred to as "working" plies or "crossed" plies, the textile or metallic reinforcers of which are positioned virtually parallel to one another inside a ply, but crossed from one ply to the other, that is to say inclined, symmetrically or asymmetrically, with respect to the median circumferential plane, by an angle which is generally between 10° and 45°, according to the type of tyre under consideration. Each of these two crossed plies consists of a rubber matrix or "coating rubber", or else sometimes "calendering rubber", which coats the reinforcers. In the belt, the crossed plies can be supplemented by various other auxiliary rubber plies or layers, with widths which can vary as the case may be, comprising or not comprising reinforcers; mention will be made, by way of example, of simple rubber cushions, "protection" plies having the role of protecting the remainder of the belt from external attacks or perforations, or else "hooping" plies comprising reinforcers oriented substantially along the circumferential direction ("zero-degree" plies), whether radially outer or inner with respect to the crossed plies.

For the reinforcing of the above belts, in particular of their crossed plies, protection plies or hooping plies, use is generally made of reinforcers in the form of steel cords or textile cords composed of thin threads assembled together by braiding or twisting.

In order to effectively fulfil their function of reinforcing radial tyre belts, which are subjected in a known way to very high stresses during running of the tyres, these steel or textile cords must satisfy a very high number of often contradictory technical criteria, such as high endurance in compression, high tensile strength, wear resistance and corrosion resistance, strong adhesion to the surrounding rubber, and be capable of maintaining this performance at a very high level for as long as possible.

The adhesion between the especially metallic cords and the surrounding rubber is therefore a key property in the effectiveness of the reinforced semi-finished products. Coating compositions comprising a diene elastomer, especially natural rubber, a reinforcing filler, and a vulcanization system which is highly specific to these compositions, are known from the prior art. This vulcanization system usually comprises high contents of sulphur and zinc oxide, a low content of stearic acid, and a "slow" vulcanization accelerator and a vulcanization retarder.

In order to make it possible for the sulphur to sulphurize the metal cords before being consumed by the vulcanization, a vulcanization retarder and a "slow" vulcanization accelerator are used.

Although this specific vulcanization system makes it possible to obtain satisfactory adhesion between the cord and the surrounding rubber composition, it constitutes a significant constraint during the manufacture of the semi-finished products. The processability, the curing time or the elongation modulus may especially be affected, causing processing difficulties, a prolonged preparation time and hence a higher cost of the reinforced semi-finished products. Moreover, this specific vulcanization system creates a certain sensitivity to thermal oxidation, causing a change in the mixtures over time, which may lead to cracking of the mixtures.

In order to respond to the drawbacks of the conventional coating systems, the applicants have now discovered a means of using a composition which can be used with a conventional vulcanization accelerator, such as a "fast" accelerator, as coating rubber for reinforced semi-finished products. This invention enables easier and faster production of the reinforced products (or reinforced semi-finished products) and also improved resistance to thermal oxidation over time, reducing the problem of cracking of the coating mixture.

BRIEF DESCRIPTION OF EMBODIMENTS OF THE INVENTION

Consequently, a first subject of the invention is a reinforced product, which can be used especially for reinforcing a finished rubber article, comprising one or more textile or metallic reinforcing thread(s), said thread(s) being covered with a sheath comprising a thermoplastic polymer composition, the sheathed thread(s) being themselves embedded in a rubber composition referred to as coating rubber, characterized in that this coating rubber is a composition based on at least one diene elastomer, a reinforcing filler, and a sulphur-based vulcanization system, which system comprises a vulcanization accelerator having a vulcanization initiation time, referred to as "t0", of less than 3.5 minutes, preferably of less than or equal to 3 minutes. The vulcanization accelerator is preferentially selected from the group consisting of compounds of the thiuram family, thiocarbamate derivatives, sulphenamides, thiophosphates and mixtures thereof, and the t0 of which is less than 3.5 minutes, preferably those in the same group, the t0 of which is less than or equal to 3 minutes. The coating rubber composition very preferentially comprises N-cyclohexyl-2-benzothiazolesulphenamide as vulcanization accelerator. Also preferentially, the invention relates to a reinforced product as defined above, in which the coating rubber composition is such that the ratio of the amounts, in phr (parts by weight per hundred parts by weight of elastomer), of sulphur and of reinforcing filler, is less than 0.08. The ratio of the amounts of sulphur and of reinforcing filler is preferably less than or equal to 0.06; preferably less than or equal to 0.05.

The invention preferentially relates to a reinforced product as defined above, in which the coating rubber composition comprises a sulphur content of less than or equal to 5 phr, preferably within a range extending from 0.1 to 5 phr. The coating rubber preferentially comprises a sulphur content of less than or equal to 3 phr, preferably within a range extending from 0.5 to 3 phr. The coating rubber more preferentially comprises a sulphur content of less than or equal to 2.5 phr, preferably within a range extending from 1 to 2.5 phr.

The invention preferentially relates to a reinforced product as defined above, in which the coating rubber composition is such that the ratio between the sulphur content and the accelerator content is strictly less than 4. The ratio between the sulphur content and the accelerator content is preferentially less than or equal to 3, more preferentially less than or equal to 1.5. The ratio between the sulphur content and the accelerator content is preferably within a range extending from 0.1 to 4, more preferentially from 0.2 to 3, and very preferentially 0.5 to 1.5.

Also preferably, the invention relates to a reinforced product as defined above, in which the coating rubber composition comprises a metal oxide and a stearic acid derivative in amounts such that the ratio of the content of metal oxide and of stearic acid derivative, in phr, is less than 7, preferably less than 5. The coating rubber composition preferentially comprises zinc oxide and stearic acid in amounts such that the ratio of the content of zinc oxide and of stearic acid, in phr, is less than 7, preferably less than 5. The coating rubber composition more preferentially comprises zinc oxide and stearic acid in amounts such that the ratio of the content of zinc oxide and of stearic acid, in phr, is less than 3, preferably between 1 and 3.

The invention preferentially relates to a reinforced product as defined above, in which the coating rubber composition comprises metal oxide at a content of less than 7 phr and a stearic acid derivative at a content of greater than 1 phr. The coating rubber composition more preferentially comprises metal oxide at a content within a range extending from 1 to 7 phr, preferably from 2 to 6 phr, more preferentially from 3 to 5 phr. Also more preferably, the coating rubber composition comprises stearic acid at a content within a range extending from 1 to 3 phr, preferably from 1 to 2 phr.

The invention preferentially relates to a reinforced product as defined above, in which the coating rubber composition does not comprise vulcanization retarder.

Also preferably, the invention relates to a reinforced product as defined above, in which the coating rubber composition does not comprise cobalt salt. The coating rubber composition preferentially does not comprise adhesion promoter.

The invention preferentially relates to a reinforced product as defined above, in which the diene elastomer of the coating rubber composition predominantly comprises an elastomer selected from the group consisting of natural rubber, synthetic polyisoprene or a mixture thereof. The coating rubber composition preferably comprises from 60 to 100 phr, preferably from 70 to 100 phr, of an elastomer selected from the group consisting of natural rubber, synthetic polyisoprene or a mixture thereof. The coating rubber composition more preferentially comprises from 80 to 100 phr, preferably from 90 to 100 phr, of an elastomer selected from the group consisting of natural rubber, synthetic polyisoprene or a mixture thereof.

The invention preferably relates to a reinforced product as defined above, in which the coating rubber composition comprises from 20 to 80 phr, preferably from 30 to 70 phr, of reinforcing filler. The coating rubber composition preferentially comprises from 35 to 60 phr, preferably from 40 to 55 phr, of reinforcing filler.

Also preferentially, the invention relates to a reinforced product as defined above, in which the coating rubber composition comprises carbon black as predominent filler.

The invention preferentially relates to a reinforced product as defined above, in which the reinforcing thread(s) are metallic threads.

Also preferentially, the invention relates to a reinforced product as defined above, in which the sheathed thread(s) is coated with an adhesive, preferably a resorcinol-formaldehyde-latex adhesive.

The invention also relates to a tyre comprising a reinforced product as defined above, preferably at least in one ply selected from crown reinforcing plies and carcass plies.

Among these tyres, the invention especially relates to tyres intended to be fitted onto motor vehicles of the passenger type, SUVs ("Sport Utility Vehicles"), two-wheel vehicles (especially bicycles and motorcycles), aircraft, or industrial vehicles chosen from vans, "heavy" vehicles i.e. underground trains, buses, heavy road transport vehicles (lorries, tractors, trailers), off-road vehicles, such as agricultural or civil engineering machines, and other transport or handling vehicles. The reinforced product of the invention may also be used for the manufacture of rubber belts or else for transport belts such as conveyor belts.

BRIEF DESCRIPTION OF THE FIGURES

The invention and its advantages will be easily understood in the light of the description and exemplary embodiments which follow, and also of the figures relating to these examples, which diagrammatically show:
    in radial section, a pneumatic tyre having a radial carcass reinforcement in accordance with the invention, incorporating a reinforced product according to the invention into its belt or into its carcass (FIG. 1);
    in cross section, an example of a reinforced product according to the invention, in the form of 3 cords individually covered with a sheath, and embedded together in the coating composition (FIG. 2);
    in cross section, another example of a reinforced product in accordance with the invention, in the form of 3 groups of cords, each group of cords being covered with a sheath, the three groups of sheathed cords being embedded in the coating composition (FIG. 3);
    in cross section, another example of a reinforced product according to the invention, in the form of a strip of 3 cords covered with the same sheath, and embedded in the coating composition (FIG. 4);
    in cross section, another example of a reinforced product according to the invention, in the form of a strip of 3 groups of cords covered with the same sheath, and embedded in the coating composition (FIG. 5).

DETAILED DESCRIPTION OF THE INVENTION

Figure 1:
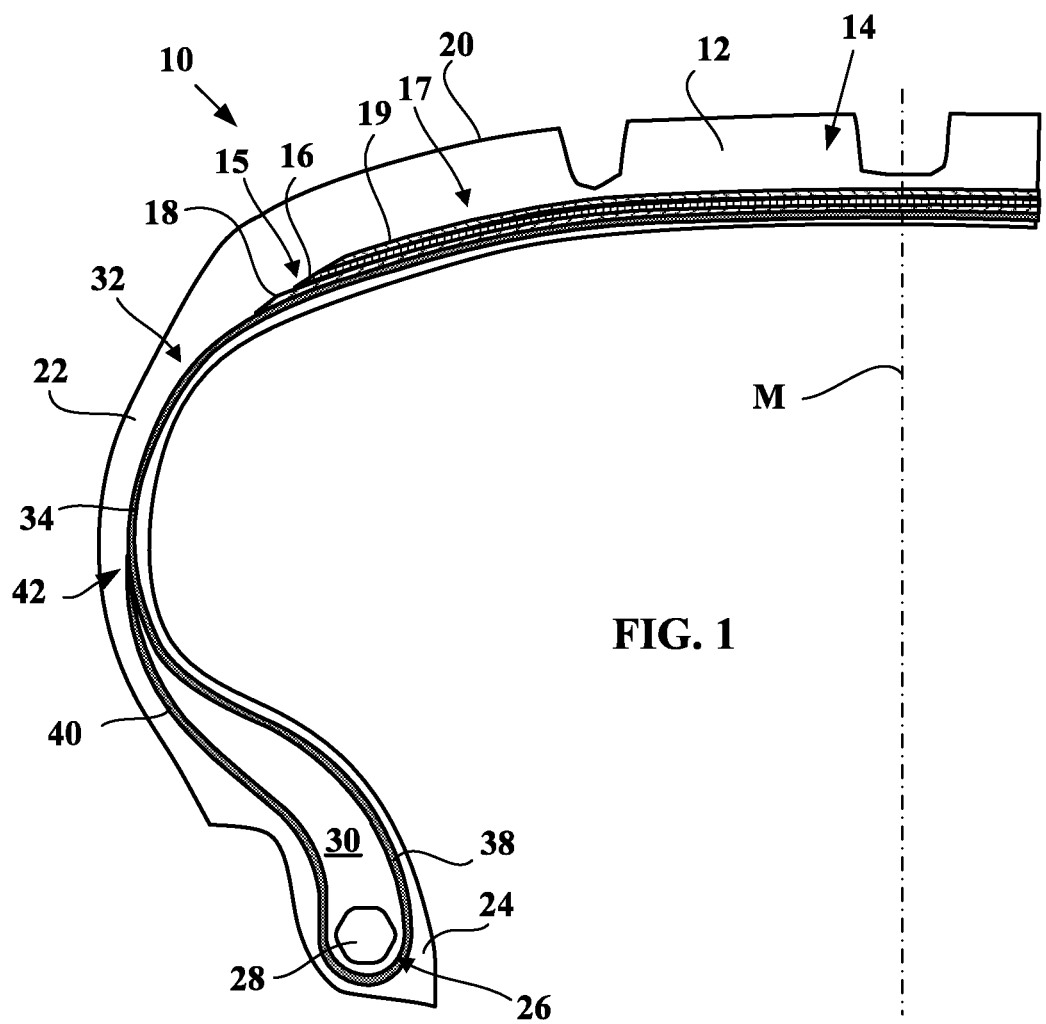
Figure 2:
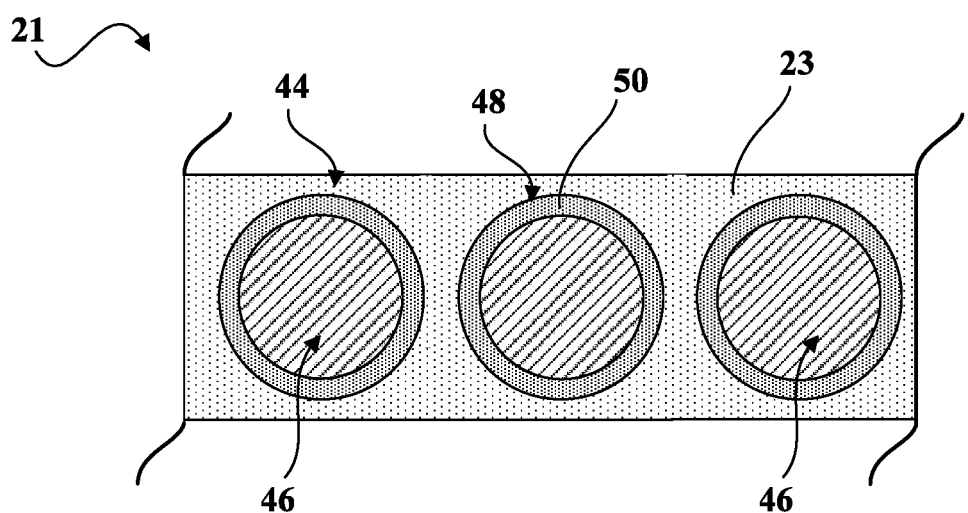
Figure 3:
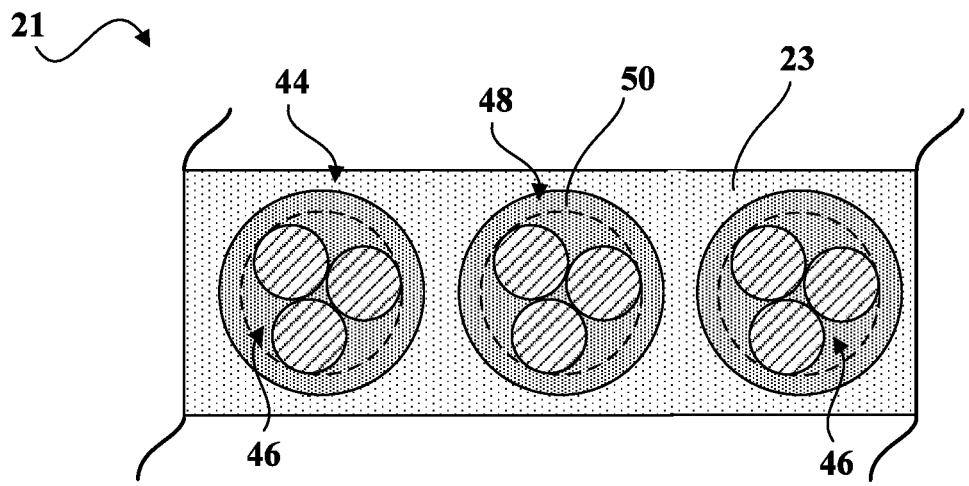
Figure 4:
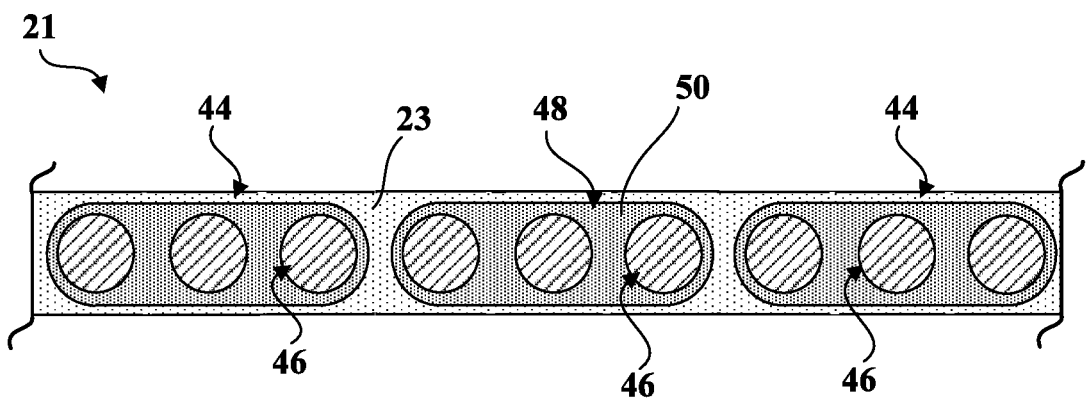
Figure 5:
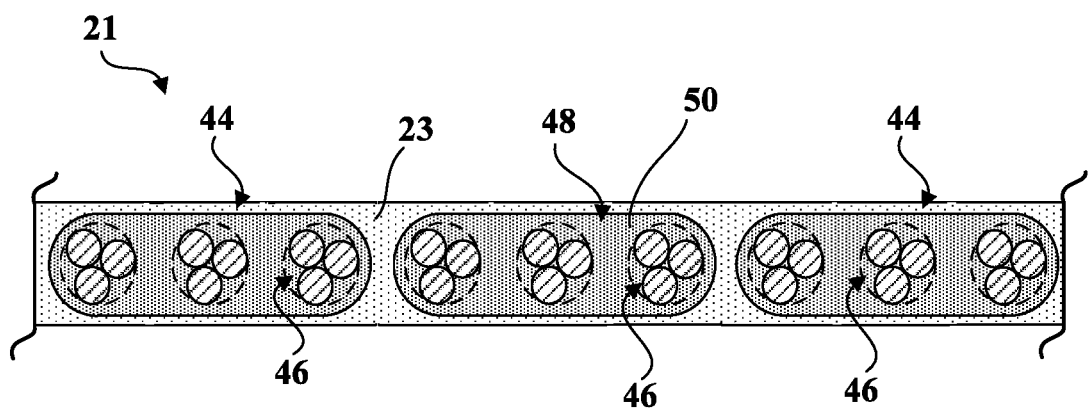

In the present description, unless expressly indicated otherwise, all the percentages (%) shown are % by weight.

The abbreviation "phr" means parts by weight per hundred parts of elastomer or rubber (of the total of the elastomers, if several elastomers are present).

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The reinforced product of the invention, also referred to as "reinforced semi-finished product" or "composite reinforcer" is therefore a sheathed reinforcer, that is to say covered with a sheath, then embedded in a "coating" composition, made of rubber, in the uncured or cured (crosslinked) state. The essential feature thereof is to comprise at least one (that is to say one or more) textile or metallic reinforcing thread(s) and also a specific composition referred to as sheathing layer or sheath, which covers and coats said thread individually or several threads collectively, forming a sheathed reinforcer. This sheathed reinforcer is then itself embedded in a rubber composition, referred to as coating composition or coating rubber. The structure of this reinforced product of the invention is described in detail below.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant polymer is the polymer representing the greatest weight with respect to the total weight of the polymers in the composition. In the same way, a "predominant" filler is that representing the greatest weight among the fillers of the composition. By way of example, in a system comprising just one polymer, the latter is predominant within the meaning of the present invention and, in a system comprising two polymers, the predominant polymer represents more than half of the weight of the polymers. On the contrary, a "minor" compound is a compound which does not represent the greatest fraction by weight among the compounds of the same type.

In the present application, when reference is made to a ratio of the amounts of a compound A and of a compound B, or a ratio between the content of a compound A and the content of a compound B, this is always a ratio in the mathematical sense of the amount of compound A over the amount of compound B.

1—SHEATHED REINFORCER

Reinforcing Thread

In the present application, the term "reinforcing thread" is generally understood to mean any elongate element of great length relative to its cross section, irrespective of the shape, for example circular, oblong, rectangular, square, or even flat, of this cross section, it being possible for this thread to be straight or not straight, for example twisted or wavy. When it is circular, its diameter is preferably less than 5 mm, more preferentially in a range from 0.1 to 2 mm.

This reinforcing thread may take any known form; it may for example be an individual monofilament of large diameter (for example and preferably equal to or greater than 50 µm), an individual ribbon, a multifilament fibre (consisting of a plurality of individual filaments of small diameter, typically less than 30 µm), a textile folded yarn formed from several fibres twisted together, a textile or metal cord formed from several fibres or monofilaments cabled or twisted together, or else an assembly or row of threads comprising several of these monofilaments, fibres, folded yarns or cords grouped together.

In the present application, threadlike reinforcer or sheathed reinforcer are generally understood to mean one or more reinforcing thread(s) covered with a sheath.

According to one preferential embodiment, the threadlike reinforcer which can be used for the purposes of the invention may therefore be in the form of a single reinforcing thread, covered in its sheath, to constitute a unitary composite sheathed thread, embedded in the coating composition specific to the invention.

According to another preferential embodiment, the threadlike reinforcer which can be used for the purposes of the invention may also be in the form of several reinforcing threads (monofilaments, ribbons, films, fibres, folded yarns or cords) grouped together, for example aligned along a main direction, whether straight or not. These reinforcing threads are then collectively covered in their sheath, then embedded in the coating composition specific to the invention, to constitute a reinforced product according to the invention, for example a belt, strip, a composite rubber fabric in various forms such as those usually encountered in the structure of tyres. By way of preferential examples of reinforced product in accordance with the invention, mention may particularly be made of fabrics constituting carcass reinforcement plies, protection crown plies, hooping crown plies or working crown plies present in the belts of tyres.

According to one preferential embodiment, the reinforcing thread is a metallic reinforcing thread.

By definition, metallic is understood to mean a thread (or monofilament) made up predominantly (i.e. more than 50% of its weight) or entirely (100% of its weight) of a metallic material. Each monofilament is preferentially made of steel, more preferentially pearlitic (or ferritic-pearlitic) carbon steel referred to as "carbon steel" below, or else made of stainless steel (by definition steel comprising at least 11% chromium and at least 50% iron). When a carbon steel is used, its carbon content (% by weight of steel) is preferably between 0.5% and 0.9%. Use is preferably made of a steel of the normal tensile (NT) or high tensile (HT) steel cord type, the tensile strength (Rm) of which is preferably greater than 2000 MPa, more preferentially greater than 2500 MPa and less than 3000 MPa (measurement carried out under traction according to standard ISO 6892, 1984). The steel may be coated with an adhesive layer, such as brass or zinc.

According to another preferential embodiment, the reinforcing thread is a textile thread consisting of a natural or synthetic polymer material or even of a mineral material. By way of example, mention may especially be made of reinforcing threads made of polyvinyl alcohol (PVA), aliphatic polyamide (e.g. polyamides 4-6, 6, 6-6, 11 or 12), aromatic polyamide (or "aramid"), polyamide-imide, polyester (e.g. PET, PEN), aromatic polyester, polyethylene, polypropylene, polyketone, cellulose, rayon, viscose, polyphenylene benzobisoxazole (PBO), glass, carbon or else ceramic.

Sheath

The threadlike reinforcement described below comprises a sheath, also referred to as sheathing layer. This type of sheath is well known to those skilled in the art. For the purposes of the invention, the sheath comprises a thermoplastic polymer composition. In one embodiment, the sheath comprises a single layer of the thermoplastic polymer composition. Alternatively, the sheath comprises several layers, at least one of them comprising a thermoplastic polymer composition.

Thermoplastic polymer composition is understood to mean a composition comprising at least one polymer having the properties of a thermoplastic polymer. The composition may optionally comprise, in supplement, other thermoplastic polymers, elastomers and other non-polymeric components.

Among the thermoplastic polymers which can be used for preparing the sheath, a thermoplastic polymer preferentially selected from the group consisting of polyamides, polyesters and polyimides, more particularly from the group consisting of aliphatic polyamides and polyesters, will preferentially be chosen, for example. Among polyesters, mention may for example be made of PET (polyethylene terephthalate), PEN (polyethylene naphthalate), PBT (polybutylene terephthalate), PBN (polybutylene naphthalate), PPT (polypropylene terephthalate), and PPN (polypropylene naphthalate). Mention may especially be made, among the aliphatic polyamides, of the polyamides 4-6, 6, 6-6, 11 or 12. This thermoplastic polymer is preferentially an aliphatic polyamide, more preferentially a polyamide 6, 6-6 or a polyamide 11.

The elastomers which may be used in the thermoplastic composition of the sheath may be preferentially of two types: thermoplastic styrene elastomers and functionalized diene elastomers. These two types of elastomers are described below.

Thermoplastic styrene elastomers (TPS) are thermoplastic elastomers in the form of styrene-based block copolymers. With an intermediate structure between thermoplastic polymers and elastomers, they are made up, as is known, from polystyrene hard sequences linked by elastomer soft sequences, for example polybutadiene, polyisoprene or poly (ethylene/butylene). This is why, as is known, TPS copolymers are generally characterized by the presence of two glass transition peaks, the first (lowest, negative temperature) peak relating to the elastomer sequence of the TPS copolymer and the second (highest, positive temperature, typically at around 80° C. or more) peak relating to the thermoplastic part (styrene blocks) of the TPS copolymer. These TPS elastomers are often triblock elastomers with two hard segments linked by a soft segment. The hard and soft segments can be positioned linearly, or in a star or branched configuration. These TPS elastomers may also be diblock elastomers with a single hard segment linked to a soft segment. Typically, each of these segments or blocks contains at least more than 5, generally more than 10, base units (for example, styrene units and isoprene units for a styrene/isoprene/styrene block copolymer). Of course, in that respect they must not be confused with statistical diene copolymer elastomers such as, for example, SIR rubbers (styrene-isoprene copolymers) or SBR rubbers (styrene-butadiene copolymers) which, as is well known, do not have any thermoplastic character.

The TPS which can be used for preparing the sheath is preferably unsaturated. The expression "unsaturated TPS elastomer" is understood by definition, and as is well known, to mean a TPS elastomer that contains ethylenically unsaturated groups, i.e. it contains carbon-carbon double bonds (whether conjugated or not). Conversely, a "saturated" TPS elastomer is of course a TPS elastomer that contains no such double bonds.

Also preferably, the TPS which can be used for preparing the sheath is functionalized, bearing functional groups selected from the epoxide, carboxyl, anhydride or acid ester groups or functions. According to one particularly preferential embodiment, this TPS elastomer is an epoxidized elastomer, i.e. one that bears one or more epoxide groups.

The TPS which can be used for preparing the sheath is preferably selected from the group consisting of styrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS), styrene/butadiene/isoprene/styrene (SBIS) block copolymers and mixtures of these copolymers. Numerous TPS elastomers are commercially available. As an example of an unsaturated and epoxidized SBS, mention may be made of "Epofriend", known and commercially available from Daicel.

Among the elastomers which can be used for preparing the sheath, a functionalized diene elastomer will preferentially be chosen, for example, said elastomer bearing functional groups selected from the epoxide, carboxyl, anhydride or acid ester groups or functions. Preferably, the functional groups are epoxide groups, that is to say that the diene elastomer is an epoxidized diene elastomer.

Among the poly(p-phenylene ethers) (or PPEs) which can be used for preparing the sheath, a PPE selected from the group consisting of poly(2,6-dimethyl-1,4-phenylene ether), poly(2,6-dimethyl-co-2,3,6-trimethyl-1,4-phenylene ether), poly-(2,3,6-trimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(1,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2-ethoxy-1,4-phenylene ether), poly(2-chloro-1,4-phenylene ether), poly(2,6-dibromo-1,4-phenylene ether), poly(3-bromo-2,6-dimethyl-1,4-phenylene ether), their respective copolymers and the mixtures of these homopolymers or copolymers will preferentially be chosen, for example. According to a specific and preferential embodiment, the PPE used is poly(2,6-dimethyl-1,4-phenylene ether), also sometimes known as polyphenylene oxide (or, in abbreviation, "PPO"). Such commercially available PPEs or PPOs are, for example, the PPEs having the name "Xyron S202" from Asahi Kasei or the PPEs having the name "Noryl SA120" from Sabic.

Preferably, according to its specific composition, the sheath comprising a thermoplastic polymer composition as described above may be self-adhesive, that is to say that its composition may be such that it has very good adhesion to the surrounding rubber composition, without requiring the use of an adhesive. This type of thermoplastic polymer composition as self-adhesive sheath is described in Applications WO2010/136389, WO2010/105975, WO2011/012521, WO2011/051204, WO2012/016757, WO2012/038340, WO2012/038341, WO2012/069346, WO2012/104279, WO2012/104280, WO2012/104281, WO2013/117474 and WO2013/117475.

Alternatively and also advantageously, the sheath is covered with a layer (adhesive) providing adhesion between the sheath and the elastomer matrix. The adhesive used is for example of the RFL (resorcinol-formaldehyde-latex) type or, for example, as described in the publications WO2013017421, WO2013017422, WO2013017423.

2—COATING COMPOSITION

Diene Elastomer

The coating composition of the reinforced product of the invention may contain a single diene elastomer or a mixture of several diene elastomers.

It is recalled here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and can especially be described as "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:

(a) any homopolymer which may be obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the above type (a) or (b).

The following are especially suitable as conjugated dienes: 1,3-butadiene, 2-methyl-1,3-butadiene (or isoprene), 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methyl styrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type. These functionalized elastomers can be used as a blend with one another or with non-functionalized elastomers. For example, it is possible to use a silanol- or polysiloxane-functionalized elastomer having a silanol end, as a mixture with an elastomer coupled and/or star-branched with tin (described in WO 11/042507), the latter representing a content of 5% to 50%, for example of 25% to 50%.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are especially suitable.

To summarize, the diene elastomer of the composition is preferentially selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds. In the case of an SBR (ESBR or SSBR) elastomer, use is especially made of an SBR having a moderate styrene content, for example of between 20% and 35% by weight, or a high styrene content, for example from 35% to 45%, a content of vinyl bonds of the butadiene part of between 15% and 70%, a content (mol %) of trans1,4-bonds of between 15% and 75% and a Tg of between −10° C. and −55° C.; such an SBR can advantageously be used as a mixture with a BR preferably having more than 90% (mol %) of cis1,4-bonds.

According to a particular preferential embodiment, the diene elastomer is a predominantly isoprene elastomer (that is to say, the fraction by weight of isoprene elastomer of which is the greatest, compared with the fraction by weight of the other elastomers). "Isoprene elastomer" is understood to mean, in a known way, an isoprene homopolymer or copolymer, in other words a diene elastomer selected from the group consisting of natural rubber (NR), which may be plasticized or peptized, synthetic polyisoprenes (IRs), various isoprene copolymers and the mixtures of these elastomers. Mention will in particular be made, among isoprene copolymers, of isobutene/isoprene (butyl rubber-IIR), isoprene/styrene (SIR), isoprene/butadiene (BIR) or isoprene/butadiene/styrene (SBIR) copolymers. This isoprene elastomer is preferably natural rubber or a synthetic cis1,4-polyisoprene; use is preferably made, among these synthetic polyisoprenes, of polyisoprenes having a content (mol %) of cis1,4-bonds of greater than 90%, even more preferentially greater than 98%. Preferentially according to this embodiment, the content of isoprene diene elastomer is more than 50 phr (that is to say from 50 to 100 phr), more preferentially at least 60 phr (that is to say from 60 to 100 phr), even more preferentially at least 70 phr (that is to say from 70 to 100 phr), more preferentially still at least 80 phr (that is to say from 80 to 100 phr), and very preferentially at least 90 phr (that is to say 90 to 100 phr). In particular, according to this embodiment, the content of isoprene diene elastomer is very preferentially 100 phr.

Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica, alumina, or else a blend of these two types of filler.

All carbon blacks, especially "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The composition can contain one type of silica or a blend of several silicas. The silica used can be any reinforcing silica known to those skilled in the art, especially any precipitated or fumed silica having a BET surface area and a CTAB specific surface area both of less than 450 m$^2$/g, preferably from 30 to 400 m$^2$/g. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface area as described in Application WO 03/16837.

Those skilled in the art will understand that, as filler equivalent to silica described above, use might be made of a reinforcing filler of another nature, especially organic nature, provided that this reinforcing filler is covered with a layer of silica or else comprises functional sites, in particular hydroxyl sites, at its surface which require the use of a coupling agent in order to form the bond between the filler and the elastomer.

These compositions can optionally also contain, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents, well known to those skilled in the art, being, for example, hydrolysable silanes, such as alkylalkoxysilanes, polyols, fatty acids, polyethers, primary, secondary or tertiary amines, or hydroxylated or hydrolysable polyorganosiloxanes. Use is especially made of silane polysulphides, referred to as "symmetrical" or "asymmetrical" depending on their specific structure, such as described, for example, in Applications WO 03/002648 (or US 2005/016651) and WO 03/002649 (or US 2005/016650).

The physical state in which the reinforcing filler is provided is not important, whether it is in the form of a powder, of micropearls, of granules, of beads or any other appropriate densified form.

Preferentially, the content of total reinforcing filler (carbon black and/or reinforcing inorganic filler, such as silica) is from 20 to 80 phr, more preferentially from 30 to 70 phr, very preferentially from 35 to 60 phr and better still from 40 to 55 phr. Below 20 phr of filler, the composition might be less effective with regard to stiffness, depending on the desired application, whereas, above 80 phr of filler, the composition might be less effective with regard to rolling resistance.

The term "predominant reinforcing filler" is understood to mean that which has the greatest content among the reinforcing fillers present in the composition. The term "predominant reinforcing filler" is especially understood to mean any reinforcing filler which represents at least 50% by weight of the reinforcing fillers present, preferentially more than 50% and more preferentially more than 60%.

According to one embodiment, the composition comprises carbon black as predominant filler, optionally in a blend with silica as the minor filler. In this case, the content of carbon black is preferentially within a range extending from 20 to 80 phr, preferably from 30 to 70 phr, more preferentially from 35 to 60 phr and better still from 40 to 55 phr. In this embodiment, the content of silica is preferentially less than 10 phr, and more preferentially is 0 phr.

Vulcanization System

The vulcanization system of the coating composition of the reinforced product of the invention is based on sulphur (or on a sulphur-donating agent) and on a "fast" accelerator, as defined below.

The vulcanization accelerators may generally be classified into several categories depending on whether they enable a more or less rapid initiation of vulcanization. This initiation of vulcanization may be represented by the "t0" value of the accelerator.

The t0 value for a given accelerator must be measured in a given rubber composition at a given vulcanization temperature. In order to compare "slow" or "fast" accelerators according to their t0 value, the reference composition used here is a composition comprising 100 phr of NR, 47 phr of carbon black N326, 0.9 phr of stearic acid, 7.5 phr of ZnO, 4.5 phr of sulphur, and the accelerator for which the t0 is to be determined, at a molar content of 2.3 mmol per 100 parts by weight of elastomer (the commercial references of the ingredients indicated here are identical to those of the ingredients used in Example 1). The method for measuring the t0 is in accordance with standard DIN-53529, at 150° C. Within the meaning of the present application, "t0" means the t0 as defined and measured below.

For example, the table below gives the t0 of certain accelerators in the proposed formulation and with the proposed measurement method.

|  | DCBS | TBBS | CBS |
| --- | --- | --- | --- |
| Molar mass (g/mol) | 346.56 | 238.38 | 264.41 |
| t0 (min) | 4.8 | 3.6 | 3.0 |

Thus, for the purposes of the present application, a "slow" accelerator will be defined as an accelerator with a t0 of greater than 3 minutes, preferably greater than 3.5 minutes. Customarily for coating composition, it is this type of accelerator which is used, to improve adhesion of the composition to the reinforcer, with the drawback of prolonging the curing time of the reinforced product and consequently lower productivity during manufacture.

The coating composition of the reinforced product according to the invention comprises a "fast" vulcanization accelerator, with a t0 of less than 3.5 minutes, preferably less than or equal to 3 minutes.

Such "fast" accelerators may be selected from the group consisting of compounds of the thiuram family, thiocarbamate derivatives (including dithiocarbamate salts, for example zinc dithiocarbamates), sulphenamides, guanidines, thiophosphates or mixtures thereof.

Among the accelerators listed above, preference is given to an accelerator selected from the group consisting of compounds of the thiuram family, thiocarbamate derivatives, sulphenamides, thiophosphates or mixtures thereof, and the t0 of which is less than 3.5 minutes, preferably those with a t0 of less than or equal to 3 minutes. N-cyclohexyl-2-benzothiazolesulphenamide (abbreviated to CBS) may very preferentially be used, which has a t0 of 3 minutes.

Preferably, a vulcanization system based on sulphur at a lowered content relative to the customary coating compositions is used. The ratio of the amounts in phr (parts by weight per hundred parts by weight of elastomer) of sulphur and of reinforcing filler is thus preferably less than 0.08. The ratio of the amounts of sulphur and of reinforcing filler is more preferentially less than or equal to 0.06; preferably less than or equal to 0.05.

The sulphur is used at a preferential content of between 0.1 and 5 phr, more preferentially of between 0.5 and 3 phr, in particular between 1.5 and 2.5 phr. Below 0.1 phr, the composition might be insufficiently vulcanized to be used as coating rubber, whereas above 5 phr the composition might have the known drawbacks of customary coating rubbers with a high sulphur content, namely a lower resistance to thermal oxidation.

For the purposes of the present invention, the vulcanization system is such that the ratio between the sulphur content (that is to say the vulcanization sulphur content) in phr and the accelerator content (that is to say the sum of the accelerator contents if there are several) in phr is strictly less than 4, preferentially less than or equal to 3, more preferentially less than or equal to 1.5. Also preferentially, this ratio is within a range extending from 0.1 to 4, more preferentially from 0.2 to 3, and very preferentially 0.5 to 1.5.

Various known secondary accelerators or vulcanization activators such as metal oxides (typically zinc oxide), stearic acid derivatives (typically stearic acid) or equivalent compounds, guanidine derivatives (in particular, diphenylguanidine), are added to this base vulcanization system, being incorporated during the first non-productive phase and/or during the productive phase, as described subsequently.

Customarily, the coating compositions have contents (in phr) of zinc oxide and of stearic acid such that the ratio of the content of zinc oxide and of stearic acid is greater than 7 and customarily within a range extending from 8 to 15. In other words, there is customarily at least 7 times more zinc oxide than stearic acid, in order to avoid the degradation of the metal cords, especially the consumption of the zinc of the brass.

In the coating compositions of the invention, the amounts (in phr) of metal oxide (especially of zinc oxide) and of stearic acid derivative (that is to say stearic acid or a salt of stearic acid, preferentially stearic acid), are preferably such that the ratio of the content of zinc oxide and of stearic acid is less than 7, typically between 1 and 7, preferably less than 5, typically between 1 and 5, and more preferentially less than 3, typically between 1 and 3. This unusual ratio in the coating compositions makes it possible to prevent the very high contents of zinc oxide customarily used, since zinc oxide raises the cost of the raw materials used. This rebalancing of the vulcanization activating complex makes it possible to improve the vulcanization kinetics and also the vulcanization yield and to reduce the phenomenon of reversion. It should moreover be noted that the stearic acid makes it possible to improve the processing of the mixture and is inexpensive, thus its greater proportion in the mixture is favourable from many perspectives.

The coating composition according to the invention may typically comprise a content of metal oxide of less than 7 phr, while coating compositions usually comprise more than 7 phr thereof. The content of metal oxide is preferably within a range extending from 1 to 7 phr, preferably from 2 to 6 phr and more preferentially from 3 to 5 phr. The content of stearic acid derivative, for its part, is typically greater than 1 phr, while coating compositions usually comprise less than 1 phr thereof. The content of stearic acid is preferably within a range extending from 1 to 3 phr and more preferentially from 1 to 2 phr.

In the present document, "stearic acid derivative" is understood to mean stearic acid or a salt of stearic acid, both being well known to those skilled in the art. By way of example of salt of stearic acid which can be used within the context of the present invention, mention may especially be made of zinc stearate or cadmium stearate.

A vulcanization retarder is customarily used in coating compositions, in order to enable the sulphurization of the reinforcer before the sulphur is consumed by the vulcanization. This retarder is well known to those skilled in the art; mention will be made, for example, of N-cyclohexylthiophthalimide (abbreviated to CTP) sold under the name Vulkalent G by Lanxess, N-(trichloromethylthio)benzenesulphonamide sold under the name Vulkalent E/C by Lanxess, or else phthalic anhydride sold under the name Vulkalent B/C by Lanxess. In the coating composition of the reinforced product of the invention, preferably no vulcanization retarder is used, thereby simplifying the mixture and reducing the cost.

Other Additives

The coating composition of the reinforced product according to the invention optionally also comprises all or a portion of the customary additives usually used in elastomer compositions intended especially for the manufacture of tyres, such as, for example, pigments, protective agents, such as antiozone waxes, chemical antiozonants, antioxidants, plasticizing agents, such as plasticizing oils or hydrocarbon-based resins well known to those skilled in the art, reinforcing resins, or methylene acceptors (for example novolak phenolic resin) or donors (for example HMT or H3M).

Coating compositions customarily also comprise an adhesion promoter, for example a cobalt salt. This is because the composition is used for the manufacture of semi-finished products intended to be in contact with one or more metal reinforcing elements, for example metal cords. The cobalt salt enables durable adhesion of the composition to the metal cords, especially to their coating, comprising, for example, brass. Nonetheless, such cobalt salts are relatively expensive. Furthermore, it is desirable to limit the amount to be employed of these salts as much as possible, to reduce their environmental impact. In the coating composition of the reinforced product of the invention, preferably no cobalt salt and preferably no adhesion promoter are used.

Of course, the compositions in accordance with the invention can be used alone or as a blend (i.e., as a mixture) with any other rubber composition which can be used for the manufacture of tyres.

It goes without saying that the invention relates to the reinforced products, the coating composition of which is in the "uncured" or non-crosslinked state (i.e., before curing) or in the "cured" or crosslinked, or else vulcanized, state (i.e., after crosslinking or vulcanization).

Manufacture of the Coating Composition

The rubber compositions forming the coating rubber are manufactured in appropriate mixers, using two successive phases of preparation according to a general procedure well known to those skilled in the art: a first phase of thermomechanical working or kneading (sometimes termed "non-productive" phase) at high temperature, up to a maximum temperature of between 130° C. and 200° C., preferably between 145° C. and 185° C., followed by a second phase of mechanical working (sometimes termed "productive" phase) at lower temperature, typically below 120° C., for example between 60° C. and 100° C., during which finishing phase the vulcanization system is incorporated.

A process which can be used for the manufacture of such rubber compositions comprises, for example and preferably, the following steps:

in a mixer, incorporating the diene elastomer and the reinforcing filler and the optional other ingredients of the composition with the exception of the vulcanization system, by thermomechanically kneading everything, once or several times, until a maximum temperature of between 130° C. and 200° C. is achieved;

cooling the combined mixture to a temperature of less than 100° C.;

subsequently incorporating the vulcanization system;

kneading everything up to a maximum temperature of less than 120° C.;

extruding or calendering the rubber composition thus obtained.

By way of example, the first (non-productive) phase is carried out in a single thermomechanical step during which all the necessary constituents, the optional supplementary covering agents or processing aids and various other additives, with the exception of the vulcanization system, are introduced into an appropriate mixer, such as an ordinary internal mixer. After cooling the mixture thus obtained during the first non-productive phase, the vulcanization system is then incorporated at low temperature, generally in an external mixer, such as an open mill; everything is then mixed (productive phase) for a few minutes, for example between 5 and 15 min.

The final composition thus obtained is subsequently calendered, for example in the form of a sheet or slab, especially for laboratory characterization, or else calendered or extruded in the form of a sheet or a rubber profiled element which can be directly used as coating rubber for a sheathed reinforcer, that is to say for one (or more) metallic or textile reinforcing thread(s), said thread(s) being covered in a sheath, as described above.

The vulcanization (or curing) is carried out in a known way at a temperature generally of between 130° C. and 200° C., for a sufficient time which can vary, for example, between 5 and 90 min, as a function especially of the curing temperature, of the vulcanization system adopted and of the vulcanization kinetics of the composition under consideration.

3—EXEMPLARY EMBODIMENTS OF THE INVENTION 3.1—Examples of Reinforced Products in Accordance with the Invention Appended FIG. 1 represents a tyre in accordance with a first embodiment of the invention and denoted by the general reference 10. The tyre 10 substantially exhibits symmetry of revolution about an axis substantially parallel to the axial direction. The tyre 10 is in this case intended for a passenger vehicle or a heavy-duty vehicle such as a lorry.

The tyre 10 comprises a crown 12 comprising a crown reinforcement 14 comprising a working reinforcement 15 comprising two working plies 16, 18 of reinforcing elements and a hooping reinforcement 17 comprising a hooping ply 19. The crown reinforcement 14 is surmounted by a tread 20. The hooping reinforcement 17, in this case the hooping ply 19, is radially interposed between the working reinforcement 15 and the tread 20.

Two sidewalls 22 extend the crown 12 radially inwards. The tyre 10 further comprises two beads 24 radially on the inside of the sidewalls 22 and each comprising an annular reinforcing structure 26, in this instance a bead wire 28, surmounted by a mass of filling rubber 30, and also a radial carcass reinforcement 32. The crown reinforcement 14 is radially interposed between the carcass reinforcement 32 and the tread 20. Each sidewall 22 connects each bead 24 to the crown 14.

The carcass reinforcement 32 preferably comprises a single carcass ply 34 of radial textile reinforcing elements. The carcass reinforcement 32 is anchored to each of the beads 24 by being turned up around the bead wire 28, so as to form, within each bead 24, a main strand 38 extending from the beads 24 through the sidewalls 22 to the crown 12, and a turn-up strand 40, the radially outer end 42 of the turn-up strand 40 being radially on the outside of the annular reinforcing structure 26. The carcass reinforcement 32 thus extends from the beads 24 through the sidewalls 22 to the crown 12. In this embodiment, the carcass reinforcement 32 also extends axially through the crown 12.

Each working ply 16, 18 forms a reinforced product 21 according to the invention, comprising reinforcing elements 44 forming an angle of from 15° and 40°, preferably ranging from 20° to 30° and in this case equal to 26° with the circumferential direction of the tyre 10. The reinforcing elements 44 are crossed from one working ply to the other.

The hooping ply 19 comprises hooping textile reinforcing elements that form an angle of at most equal to 10°, preferably ranging from 5° to 10°, with the circumferential direction of the tyre 10. In this instance, the hooping textile reinforcing elements are folded yarns produced in a heat-shrinkable material, in this case made of polyamide 66, each folded yarn consisting of two spun yarns of 140 tex which have been twisted together (on a direct cabling machine) at 250 turns/metre, with a diameter equal to approximately 0.66 mm. The thermal contraction CT of each hooping textile reinforcing element is approximately 7%.

The working plies 16, 18, hooping ply 19 and carcass ply 34 comprise an elastomer matrix 23, in which the reinforcing elements of the corresponding ply are embedded. The rubber compositions of the elastomer matrices 23 of the working plies 16, 18, hooping ply 19 and carcass ply 34 may be conventional compositions for the coating of reinforcing elements conventionally comprising a diene elastomer, for example natural rubber, a reinforcing filler, for example carbon black and/or silica, a crosslinking system, for example a vulcanization system, preferably comprising sulphur, stearic acid and zinc oxide, and possibly a vulcanization accelerator and/or retarder and/or various additives. At least one of the plies comprising a reinforced product comprises a reinforced product according to the invention. In this connection, this ply comprises a coating composition 23 specific to the invention, that is to say a composition as defined above and below for the purposes of the invention.

FIGS. 2 to 5 represent various embodiments of the invention, that is to say various arrangements of reinforced products 21 according to the invention. The reinforcing elements (one or more threads) 44 of the reinforced product 21 are arranged side by side along a main direction. The reinforcing elements 44 extend parallel to one another. Each reinforcing element 44 comprises at least one threadlike element 46. Each reinforcing element 44 also comprises at least one sheath 48 coating the threadlike element 46 and comprising at least one layer 50 of a thermoplastic polymer composition. The sheathed reinforcer 44 is embedded in a coating composition 23.

The sheath 48 comprises a single layer 50 of the thermoplastic polymer composition which may comprise a thermoplastic polymer, a functionalized diene elastomer, a poly (p-phenylene ether) or a mixture of these materials. In this case, the thermoplastic polymer composition comprises a thermoplastic polymer, for example polyamide 66. Optionally, the thermoplastic polymer composition may comprise a functionalized diene elastomer, for example a styrene thermoplastic comprising an epoxide, carbonyl, anhydride or ester function and/or a poly(p-phenylene ether). The sheath 48 is coated with an adhesive for adhesion (not represented) between the sheath 48 and the elastomer matrix 23.

The difference between the embodiments presented in FIGS. 2 to 5 lies in the arrangement and the number of cords in the sheath to form the sheathed reinforcer 44 which can be used in the reinforced product 21 of the invention. Thus, the sheathed reinforcer 44 is in the form of 3 cords individually covered with a sheath, and embedded together in the coating composition in FIG. 2, in the form of 3 groups of cords, each group of cords being covered with a sheath, the three groups of sheathed cords being embedded in the coating composition in FIG. 3, in the form of a strip of 3 cords covered with the same sheath, and embedded in the coating composition in FIG. 4, and in the form of a strip of 3 groups of cords covered with the same sheath, and embedded in the coating composition in FIG. 5.

3.2—Use of the Reinforced Product in Tyres

The reinforced product of the invention described above can especially be used for the manufacture of any finished rubber article or semi-finished rubber product, in particular for reinforcing pneumatic tyres for all vehicle types, in particular passenger vehicles or industrial vehicles such as heavy-duty vehicles.

As already indicated above, this reinforced product of the invention may be in various forms, in a unitary form (with a single reinforcing thread) or else in the form of a rubber block, ply, belt or strip, in which several textile and/or metallic reinforcing thread(s) are incorporated, for example by calendering. The definitive adhesion between the sheathed threadlike reinforcer and the coating rubber may be obtained at the end of curing, preferably under pressure, of the finished article for which the threadlike reinforcer of the invention is intended.

3.3—Example 1—Rubber Tests

For the requirements of these tests, rubber compositions were prepared in accordance with the invention, the formulations of which are given in Table 1; the contents of the different products is expressed in phr (parts by weight per hundred parts by weight of elastomer).

The following procedure was used for the manufacture of these compositions: the reinforcing filler (carbon black and/or silica), the diene elastomer and also the various other ingredients, with the exception of the vulcanization system, were successively introduced into an internal mixer, the initial vessel temperature of which was approximately 50° C.; the mixer was thus filled to approximately 70% (% by volume). A thermomechanical working (non-productive phase) was then carried out in one step of approximately 3 to 5 min, until a maximum "dropping" temperature of 160° C. was reached. The mixture thus obtained was recovered and cooled and then sulphur and an accelerator of sulphenamide type were incorporated in an external mixer (homofinisher) at 40° C., everything being mixed (productive phase) for a few minutes. The composition thus obtained was subsequently calendered in the form of slabs which can be used as coating rubber for the sheathed threadlike reinforcements according to the invention.

These compositions were compared to a control composition with a similar formulation and prepared identically, in which only the vulcanization system was different. The control composition has a vulcanization system which is customary for a coating composition, whereas the compositions of the invention have the specific vulcanization system as defined for the invention. Compositions C1 and C2 are not in accordance with the invention, composition C3 is in accordance with the invention.

TABLE 1

| Formulation: | C-1 | C-2 | C-3 |
|---|---|---|---|
| Natural rubber (1) | 100 | 100 | 100 |
| Carbon black (2) | 47 | 47 | 47 |
| Zinc oxide (3) | 7.5 | 7.5 | 7.5 |
| Stearic acid (4) | 0.9 | 0.9 | 0.9 |
| 6PPD (5) | 1.5 | 1.5 | 1.5 |
| CTP (6) | 0.15 | — | — |
| Cobalt salt | 1.1 | — | — |
| Sulphur | 4.5 | 1.6 | 1.6 |
| DCBS (7) | 0.8 | 0.8 | — |
| CBS (8) | — | — | 0.6 |

(1) Natural rubber (peptized);
(2) ASTM grade N236 (Cabot);
(3) Zinc oxide, industrial grade - Umicore;
(4) Stearin, Pristerene 4931 from Uniqema;
(5) N-(1,3-dimethylbutyl)-N'-phenyl-p-phenylenediamine (Santoflex 6-PPD) from Flexsys;
(6) CTP, N-(cyclohexylthio)phthalimide; sold under the name Vulkalent G by Lanxess or also Duslin P by Duslo;
(7) N-dicyclohexyl-2-benzothiazolesulphenamide (Santocure DCBS from Flexsys);
(8) N-cyclohexyl-2-benzothiazolesulphenamide (Santocure CBS from Flexsys).

The properties of these different compositions were evaluated and are presented in Table 2 below. These properties were evaluated at the starting point then after ageing of the composition at 77° C. and under 50% relative humidity for a duration of 14 days then of 28 days.

The properties measured are the moduli of the compositions, as they are determined during to tensile testing. These tests make it possible to determine the elasticity stresses and the properties at break. These tests are carried out in accordance with French Standard NF T 46-002 of September 1988. The "nominal" secant moduli (or apparent stresses, in MPa) at 10% elongation (denoted "MAS10"), 100% elongation ("MAS100") and 300% elongation ("MAS300") are measured in second elongation (i.e., after an accommodation cycle). All these tensile measurements are carried out under the standard conditions of temperature (23±2° C.) and hygrometry (50+5% relative humidity), according to French Standard NF T 40-101 (December 1979).

TABLE 2

| | C-1 | C-2 | C-3 |
|---|---|---|---|
| Curing time at 140° C. (min) | 50 | 50 | 35 |
| MAS10% (MPa) | 5.16 | 3.01 | 3.33 |
| MAS10% (MPa) aged 14 days | 7.22 | 3.92 | 4.19 |
| | (+40%) | (+30%) | (+26%) |

TABLE 2-continued

| | C-1 | C-2 | C-3 |
|---|---|---|---|
| MAS10% (MPa) aged 28 days | 7.73 | 3.99 | 4.39 |
| | (+50%) | (+33%) | (+32%) |
| MAS100% (MPa) | 2.38 | 1.36 | 1.49 |
| MAS100% (MPa) aged 14 days | 3.61 | 1.91 | 2.03 |
| | (+51%) | (+40%) | (+36%) |
| MAS100% (MPa) aged 28 days | 4.24 | 2.05 | 2.21 |
| | (+78%) | (+51%) | (+48%) |
| MAS300% (MPa) | 2.43 | 1.60 | 1.78 |
| MAS300% (MPa) aged 14 days | 3.59 | 2.32 | 2.45 |
| | (+48%) | (+45%) | (+38%) |
| MAS300% (MPa) aged 28 days | 4.12 | 2.46 | 2.60 |
| | (+70%) | (+53%) | (+46%) |

The results given in Table 2 indicate especially that composition C3 in accordance with the invention has a better resistance to thermal oxidation ageing than composition C2, which is identical except for the vulcanization accelerator which is a slow accelerator in C2 and a fast accelerator in C3.

In conclusion, the coating rubber used in the reinforced product of the invention has increased properties of resistance to ageing, for example giving the carcass ply or the belt of a tyre a significantly improved protection from risks linked to thermal oxidation.

3.4—Example 2—Tests of Adhesion of the Coating Composition to the Threadlike Reinforcer In order to test the adhesion of the coating composition onto a threadlike reinforcer, a measurement according to standard ASTM D2229 was carried out.

Compositions C(a) (control) and C(b) (in accordance with the invention) presented in Table 3 below were combined with a brass metallic reinforcer consisting of 2+7 0.7% carbon steel threads 28/100ths of a millimetre in diameter with an assembly pitch of 7.5 mm/15 mm, the brass comprising 68% copper, sheathed and unsheathed, as indicated in Table 4 below and these combinations were tested with regard to the adhesion of the coating composition to the reinforcer. In the case in which the reinforcer is sheathed, the sheath is made of polyamide 6-6, approximately 0.14 mm thick on average for a sheathed cord diameter of approximately 1.35 mm, and covered with an RFL adhesive.

TABLE 3

| | C(a) | C(b) |
|---|---|---|
| Natural rubber (1) | 100 | 100 |
| Carbon black (2) | 52 | 52 |
| Zinc oxide (3) | 8 | 4 |
| Stearic acid (4) | 0.5 | 1.5 |
| 6PPD (5) | 1.5 | 1.5 |
| CTP (6) | 0.2 | — |
| Cobalt salt | 1 | — |
| Sulphur | 6 | 3 |
| DCBS (7) | 1 | — |
| CBS (8) | — | 1 |

(1) Natural rubber (peptized);
(2) ASTM grade N236 (Cabot);
(3) Zinc oxide, industrial grade - Umicore;
(4) Stearin, Pristerene 4931 from Uniqema;
(5) N-(1,3-dimethylbutyl)-N'-phenyl-p-phenylenediamine (Santoflex 6-PPD) from Flexsys;
(6) CTP, N-(cyclohexylthio)phthalimide; sold under the name Vulkalent G by Lanxess or also Duslin P by Duslo;
(7) N-dicyclohexyl-2-benzothiazolesulphenamide (Santocure DCBS from Flexsys);
(8) N-cyclohexyl-2-benzothiazolesulphenamide (Santocure CBS from Flexsys).

TABLE 4

|  | C(a) | C(b) |
|---|---|---|
| Brass reinforcer | 100 | 65 |
| Sheathed brass reinforcer | 143 | 148 |

The results given in Table 4 indicate especially that composition C(b), in accordance with the requirements of the invention, has a deteriorated adhesion to a brass reinforcer customary in tyres, whereas this same composition, on a sheathed reinforcer, has a similar, or else better, adhesion than that of the control composition C(a).

This result, combined with the excellent resistance to ageing of the composition C(c), like the compositions presented in Example 1, illustrates the full benefit of the invention which makes it possible to have reinforced products having significantly improved adhesion and resistance to ageing compared to the reinforced products known hitherto.

The invention claimed is:

1. A reinforced product comprising one or more textile or metallic reinforcing threads, said one or more textile or metallic reinforcing threads being covered with a sheath comprising a thermoplastic polymer composition, the sheathed one or more textile or metallic reinforcing threads being themselves embedded in a coating rubber composition,
wherein the coating rubber composition is based on at least one diene elastomer, a reinforcing filler, and a sulfur-based vulcanization system, said system comprising a vulcanization accelerator having a vulcanization initiation time t0 of less than 3.5 minutes,
wherein a sulfur content of the sulfur-based vulcanization system is within a range extending from 0.5 to 3 phr, and
wherein a ratio between the sulfur content of the sulfur-based vulcanization system and the vulcanization accelerator content is within a range extending from 0.1 to 4.

2. The reinforced product according to claim 1, wherein the vulcanization accelerator has a vulcanization initiation time t0 of less than or equal to 3 minutes.

3. The reinforced product according to claim 1, wherein the vulcanization accelerator comprises compounds of thiuram family, thiocarbamate derivatives, sulphenamides, thiophosphates, or mixtures thereof.

4. The reinforced product according to claim 3, wherein the vulcanization accelerator comprises N-cyclohexyl-2-benzothiazolesulphenamide.

5. The reinforced product according to claim 1, wherein the coating rubber composition has a ratio of the amounts, in phr (parts by weight per hundred parts by weight of elastomer), of sulfur of the sulfur-based vulcanization system and of reinforcing filler, of less than 0.08.

6. The reinforced product according to claim 1, wherein the coating rubber composition comprises a metal oxide and a stearic acid derivative in addition to the vulcanization accelerator in amounts such that a ratio of the content of metal oxide and of stearic acid derivative, in phr, is less than 7.

7. The reinforced product according to claim 1, wherein the coating rubber composition comprises zinc oxide and stearic acid in addition to the vulcanization accelerator in amounts such that a ratio of the content of zinc oxide and of stearic acid, in phr, is less than 7.

8. The reinforced product according to claim 7, wherein the ratio of the content of zinc oxide and of stearic acid, in phr, is between 1 and 3.

9. The reinforced product according to claim 1, wherein the coating rubber composition comprises a metal oxide in addition to the vulcanization accelerator at a content of less than 7 phr and a stearic acid derivative at a content of greater than 1 phr.

10. The reinforced product according to claim 1, wherein the coating rubber composition comprises a metal oxide in addition to the vulcanization accelerator at a content within a range extending from 1 to 7 phr.

11. The reinforced product according to claim 1, wherein the coating rubber composition comprises a stearic acid derivative in addition to the vulcanization accelerator at a content within a range extending from 1 to 3 phr.

12. The reinforced product according to claim 1, wherein the coating rubber composition does not comprise vulcanization retarder.

13. The reinforced product according to claim 1, wherein the coating rubber composition does not comprise cobalt salt.

14. The reinforced product according to claim 1, wherein the coating rubber composition does not comprise an adhesion promoter.

15. The reinforced product according to claim 1, wherein the at least one diene elastomer predominantly comprises an elastomer selected from the group consisting of natural rubber, synthetic polyisoprene and a mixture thereof.

16. The reinforced product according to claim 1, wherein the coating rubber composition comprises from 20 to 80 phr of reinforcing filler.

17. The reinforced product according to claim 1, wherein the coating rubber comprises carbon black as the predominant reinforcing filler.

18. The reinforced product according to claim 1, wherein the one or more textile or metallic reinforcing threads are one or more metallic reinforcing threads.

19. The reinforced product according to claim 1, wherein the sheathed one or more textile or metallic reinforcing threads are coated with an adhesive.

20. The reinforced product according to claim 19, wherein the adhesive is a resorcinol-formaldehyde-latex adhesive.

21. A tire comprising the reinforced product according to claim 1.

22. The tire according to claim 21, wherein the reinforced product is present in the tire at least in one ply selected from crown reinforcing plies and carcass plies.

* * * * *